United States Patent
Homchaudhuri et al.

(10) Patent No.: US 12,426,086 B2
(45) Date of Patent: Sep. 23, 2025

(54) FLEXIBLE MULTI-LINK OPERATION ARCHITECTURE

(71) Applicant: QUALCOMM Incorporated, San Diego, CA (US)

(72) Inventors: Sandip Homchaudhuri, San Jose, CA (US); Guido Robert Frederiks, Watsonville, CA (US); Nicholas Kucharewski, San Jose, CA (US); Patrick Poon-Cheuk Chan, San Jose, CA (US); Srinivas Katar, Fremont, CA (US); Harinder Singh, Saratoga, CA (US); John Thomas Harrsen, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 17/952,227

(22) Filed: Sep. 24, 2022

(65) Prior Publication Data
US 2024/0107578 A1    Mar. 28, 2024

(51) Int. Cl.
*H04W 74/0808*    (2024.01)

(52) U.S. Cl.
CPC .............................. *H04W 74/0808* (2013.01)

(58) Field of Classification Search
CPC ... H04W 28/04; H04W 72/04; H04W 72/042; H04W 88/08; H04W 74/0808; H04L 5/0007
USPC ........................................................ 370/329
See application file for complete search history.

(56) References Cited

U.S. PATENT DOCUMENTS

| | | | | |
|---|---|---|---|---|
| 7,590,100 | B2 * | 9/2009 | Smith | H04W 52/0229 370/344 |
| 12,120,741 | B2 * | 10/2024 | Jang | H04W 74/0816 |
| 12,120,760 | B2 * | 10/2024 | Chu | H04W 76/15 |
| 2014/0169290 | A1 * | 6/2014 | Seok | H04W 74/006 370/329 |
| 2015/0063318 | A1 * | 3/2015 | Merlin | H04W 72/0446 370/336 |
| 2018/0152953 | A1 * | 5/2018 | Park | H04L 5/0037 |

(Continued)

FOREIGN PATENT DOCUMENTS

| | | | | |
|---|---|---|---|---|
| JP | | 2610825 A * | 9/2021 | H04W 84/12 |
| WO | WO 2024/183877 A1 * | | 9/2024 | H04W 24/02 |

OTHER PUBLICATIONS

International Search Report and Written Opinion—PCT/US2023/074595—ISA/EPO—Dec. 14, 2023.

*Primary Examiner* — Peter G Solinsky
*Assistant Examiner* — Sanjay K Dewan
(74) *Attorney, Agent, or Firm* — Arun Swain

(57) ABSTRACT

Certain aspects of the present disclosure provide an architecture and method for multi-link operation (MLO) at an access point (AP). The method generally includes obtaining a packet from at least one buffer and selecting a processing path, from first and second processing paths, for a packet to be routed from the at least one buffer to at least one of a plurality of radio components for wireless transmission to at least one peer via one or more links, wherein: the first processing path is configured to bind the packet to one of the one or more links based on at least one code-implemented rule, and the second processing path is configured to bind the packet to one of the one or more links based on instantaneous channel sensing.

19 Claims, 9 Drawing Sheets

⑨ packet for peer p2 is queued for transmission into both WiFi SoC2 and WiFi SoC3, sent to p2 on WiFi SoC 3 Link 1

(56) References Cited

U.S. PATENT DOCUMENTS

| | | | | |
|---|---|---|---|---|
| 2021/0251006 A1* | 8/2021 | Cariou | .............. | H04W 74/0816 |
| 2021/0400537 A1* | 12/2021 | Zhang | .................... | H04L 47/28 |
| 2022/0124857 A1* | 4/2022 | Patil | .................... | H04W 76/14 |
| 2022/0132608 A1* | 4/2022 | Chu | ...................... | H04W 76/15 |
| 2022/0159718 A1* | 5/2022 | Fang | .................. | H04W 74/0808 |
| 2023/0008481 A1* | 1/2023 | Ina | ................... | H04W 74/0866 |
| 2023/0083654 A1* | 3/2023 | Jang | ......................... | H04L 1/18 |
| | | | | 370/329 |
| 2023/0120236 A1* | 4/2023 | Jang | ..................... | H04W 28/02 |
| | | | | 370/329 |
| 2023/0328774 A1* | 10/2023 | Jang | ..................... | H04W 74/04 |
| | | | | 370/329 |
| 2024/0114394 A1* | 4/2024 | Alexander | .............. | H04L 47/62 |
| 2024/0163785 A1* | 5/2024 | Kang | ................ | H04W 52/0216 |
| 2024/0298369 A1* | 9/2024 | Ratnam | ............ | H04W 74/0816 |

* cited by examiner

FLEXIBLE MULTI-LINK OPERATION ARCHITECTURE

BACKGROUND

Technical Field

Aspects of the present disclosure relate to wireless communications, and more particularly, to techniques and an architecture for flexible multi-link operation.

Description of the Related Technology

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (such as tens of meters to a few hundred meters).

Multi-link operation (MLO) multi-link operation is another scheme designed to address the issue increasing bandwidth requirements. MLO allows concurrent data transmission and reception in different frequency channels and bands. MLO allows wireless devices, such as access points (APs) and stations to take advantage of multiple radio interfaces to transmit and receive data. One potential challenge with MLO, however, is how to optimize the distribution of data traffic across the multiple interfaces.

SUMMARY

One innovative aspect of the subject matter described in this disclosure provides a method for multi-link operation (MLO) at an access point (AP). The method includes obtaining a packet from at least one buffer; and selecting a processing path, from first and second processing paths, for a packet to be routed from the at least one buffer to at least one of a plurality of radio components for wireless transmission to at least one peer via one or more links, wherein: the first processing path is configured to bind the packet to one of the one or more links based on at least one code-implemented rule, and the second processing path is configured to bind the packet to one of the one or more links based on instantaneous channel sensing.

Another innovative aspect of the subject matter described in this disclosure provides an apparatus for multi-link operation (MLO). The apparatus includes at least one buffer; and at least one first processing block configured to select a processing path, from first and second processing paths, for a packet to be routed from the at least one buffer to at least one of a plurality of radio components for wireless transmission to at least one peer via one or more links, wherein: the first processing path is configured to bind the packet to one of the one or more links based on at least one code-implemented rule, and the second processing path is configured to bind the packet to one of the one or more links based on instantaneous channel sensing.

Other innovative aspects of the subject matter described in this disclosure provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration. Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF DRAWINGS

The appended figures depict certain features of the various aspects described herein and are not to be considered limiting of the scope of this disclosure.

DETAILED DESCRIPTION

Figure 1:
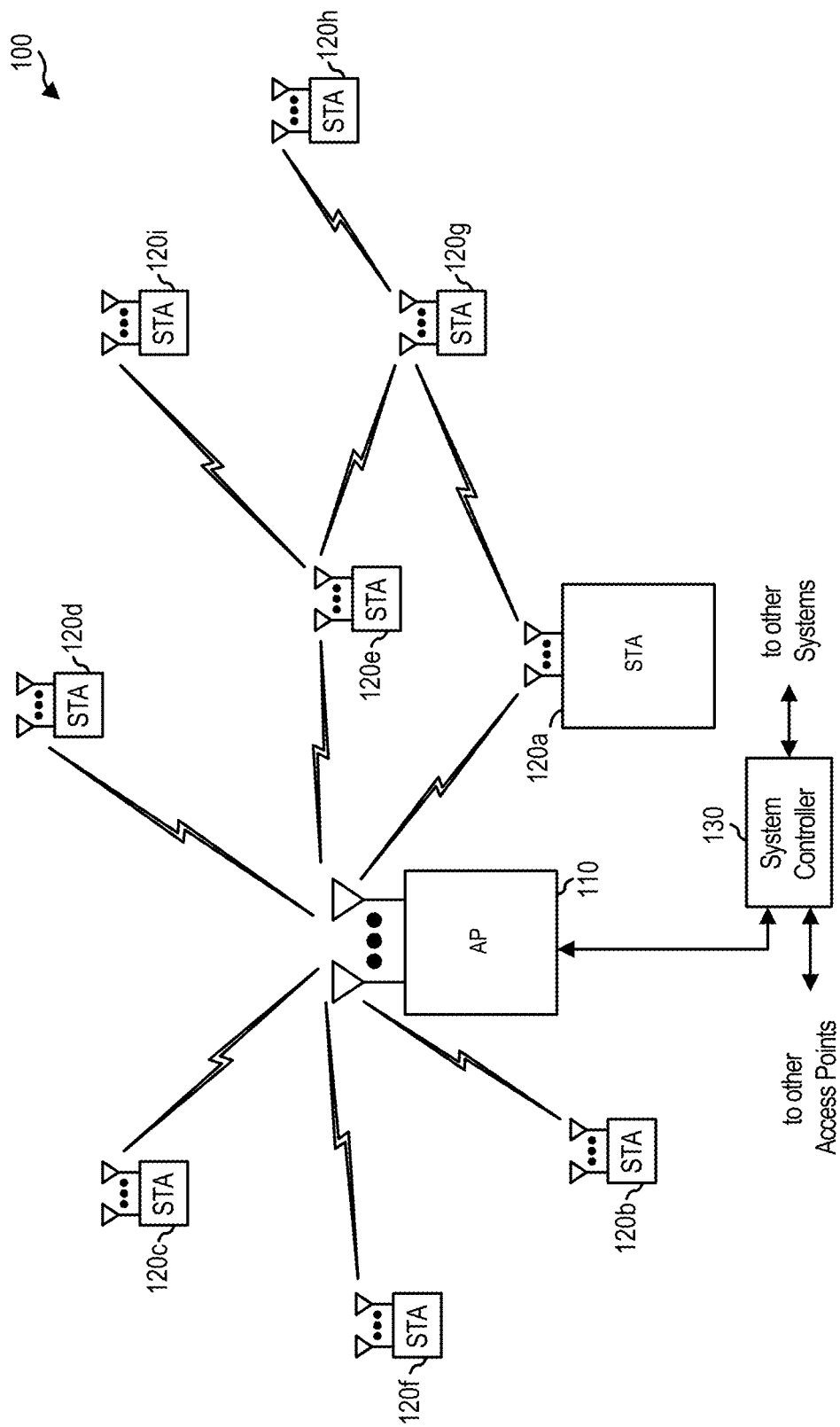
FIG. 1 depicts an example wireless communications network.

Aspects of the present disclosure provide apparatuses, methods, processing systems, and computer-readable mediums for techniques and an architecture for flexible multi-link operation (MLO).

MLO generally refers to a feature in advanced wireless systems (e.g., such as that defined by the IEEE 802.11-2020 specification or amendments thereof including, but not limited to 802.11be Extremely High Throughput (EHT) and the 802.11 amendment associated with Wi-Fi 8)) that enables the utilization of multiple links using individual frequency channels to transmit and receive between devices. MLO may enable concurrent utilization of multiple radio links of different frequency channels/bands by an AP, a client, or both. A device capable of MLO is generally referred to as a multi-link device (MLD).

MLO enables a pair of devices to use multiple wireless links in different bands simultaneously for transmission and reception. MLO allows simultaneous use of multiple bands at a lower hardware cost than that of a single multiband radio and also enhances the throughput of a single data session, while current multiband APs may allow client devices to connect using only one band at a time. Ideally, the maximum achievable throughput of MLO is the sum of the achievable throughput for each link.

One potential challenge of an MLD operating in a multi-link mode is how to optimally assign packets to links. One potential mechanism to assign packets to links is hardware-based. In this case, a current (just-in-time) clear channel assessment (CCA) is observed at each link and the MLD assigns a packet to an available link, as determined by the CCA observation based on instantaneous assessment. Hardware-based link selection may provide a fast medium access solution which can help the transmitter navigate around in high channel interference caused by WLAN devices.

While this approach may have a fast medium access time, it may require relatively complex circuitry to ensure the same packet is not sent out on multiple links. Further, due to the just-in-time nature of the CCA observation, there may be little or no control over which link is selected. Thus, a network operator may lose control over the spectrum which may cause a number of problems. For example, a user without low latency data could inundate a link the operator may want to reserve for premium services (e.g., paid 5G services) requiring low latency.

Aspects of the present disclosure, however, provide a flexible MLO architecture that allows packets to be assigned links using a software based processing path or a hardware based processing path. The software based processing path may allow for link selection to be optimized, for example, based on accurate and arbitrarily recent channel state information. The software based processing path may also allow for operator selected biases to influence link selection. The hardware based processing path may be selected, however, when medium access latency is a primary concern, especially in the presence of very high interference caused by other operating WLAN devices on the channel which can provide a better low latency operating point.

Thus, the flexible architecture proposed herein may provide advantages over conventional approaches that utilize either hardware based link selection or software based link selection. By providing the ability to dynamically select between hardware and software based link selection at a per flow per packet level, the flexible architecture proposed herein may allow an optimal method to be selected, based on desired results and current operating conditions. For example, a software based approach may be selected to gain some control over the spectrum, while the hardware based approach may be selected when low latency is a primary goal. In other words, the architecture proposed herein provides the advantages of both hardware and software based link selection.

Introduction to Wireless Communications Networks

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

Example Wireless Communications System

FIG. 1 is a diagram illustrating an example wireless communication system 100, in accordance with certain aspects of the present disclosure. System 100 may be a multiple-input multiple-output (MIMO)/multi-link operation (MLO) system 100. As shown in FIG. 1, an access point (AP) 110 includes an association manager 112 that may be configured to take one or more actions described herein. The wireless station (STA) 120a includes an association manager 122 that may be configured to take one or more actions described herein. In aspects, AP 110 and wireless station 120a may be MLDs as further described herein with respect to FIG. 3.

For simplicity, only one AP 110 is shown in FIG. 1. An AP is generally a fixed station that communicates with the wireless STAs and may also be referred to as a base station (BS) or some other terminology. A wireless STA may be fixed or mobile and may also be referred to as a mobile STA, a wireless device, or some other terminology. AP 110 may communicate with one or more wireless STAs 120 at any given moment on the downlink (DL) and/or uplink (UL). The DL (i.e., forward link) is the communication link from AP 110 to the wireless STAs 120, and the UL (i.e., reverse link) is the communication link from the wireless STAs 120 to AP 110. A wireless STA 120 may also communicate peer-to-peer with another wireless STA 120, for example, via a direct link such as a tunneled direct link setup (TDLS). A system controller 130 may be in communication with and provide coordination and control for the access points.

While portions of the following disclosure will describe wireless STAs 120 capable of communicating via Spatial Division Multiple Access (SDMA), for certain aspects, the wireless STAs 120 may also include some wireless STAs 120 that do not support SDMA. Thus, for such aspects, an AP 110 may be configured to communicate with both SDMA and non-SDMA wireless STAs 120. This approach may conveniently allow older versions of wireless STAs 120 ("legacy" stations) to remain deployed in an enterprise, extending their useful lifetime, while allowing newer SDMA wireless STAs 120 to be introduced as deemed appropriate.

System 100 employs multiple transmit and multiple receive antennas for data transmission on the DL and UL. AP 110 is equipped with $N_{ap}$ antennas and represents the multiple-input (MI) for DL transmissions and the multiple-output (MO) for UL transmissions. A set of K selected wireless stations 120 collectively represents the multiple-output for DL transmissions and the multiple-input for UL transmissions. For pure SDMA, it is desired to have $N_{ap} \geq K \geq 1$ if the data symbol streams for the K wireless STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected wireless STA transmits user-specific data to and/or receives user-specific data from the access point. In general, each selected wireless STA may be equipped with one or multiple antennas (i.e., $N_{sta} \geq 1$). The K selected wireless STAs can have the same or different number of antennas.

System 100 may be a time division duplex (TDD) system or a frequency division duplex (FDD) system. For a TDD system, the DL and UL share the same frequency band. For an FDD system, the DL and UL use different frequency bands. System 100 may also utilize a single carrier or multiple carriers for transmission. Each wireless STA may be equipped with a single antenna or multiple antennas. System 100 may also be a TDMA system if wireless STAs 120 share the same frequency channel by dividing transmission/reception into different time slots, each time slot being assigned to a different wireless STA 120.

Figure 2:
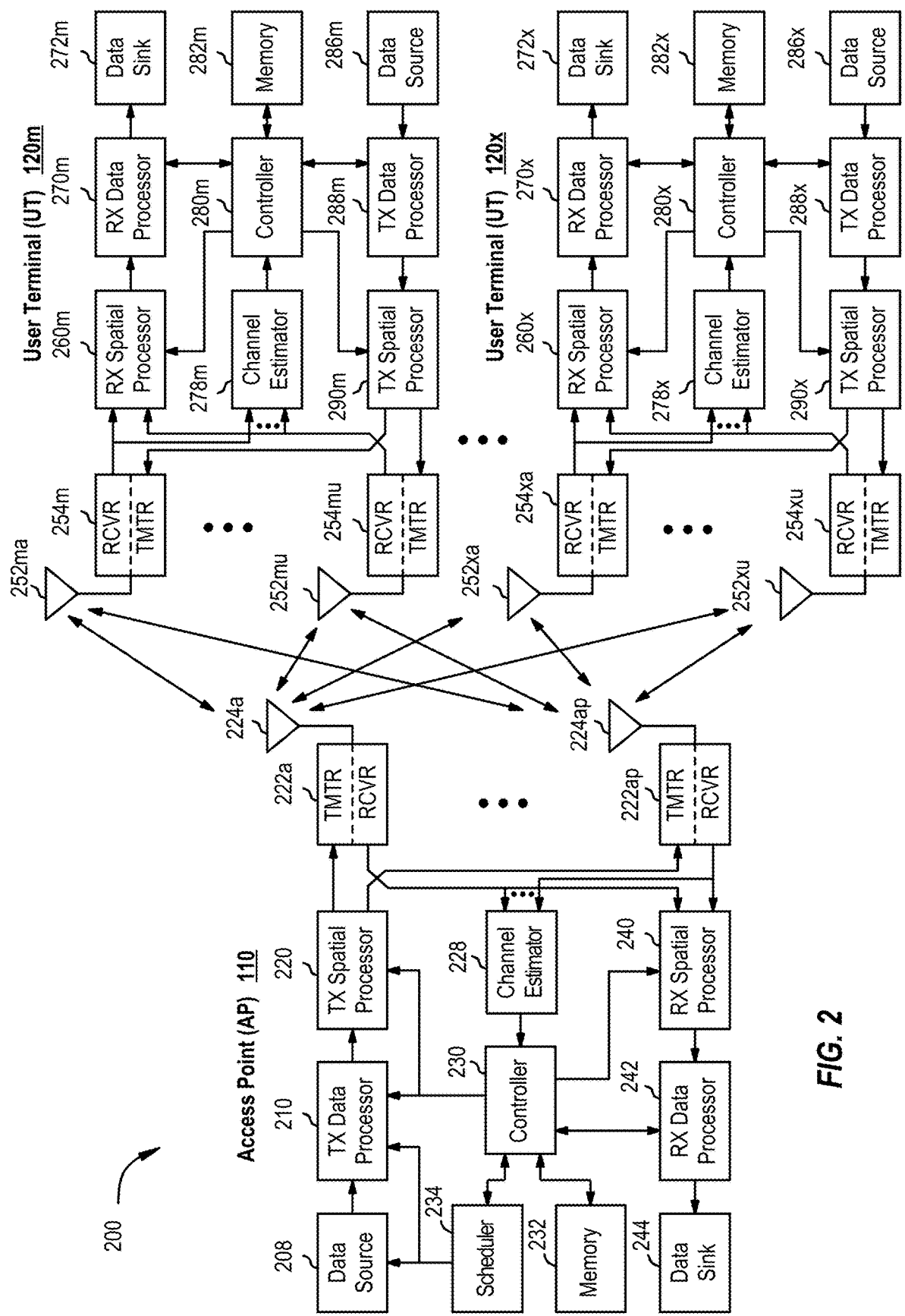
FIG. 2 depicts an example disaggregated base station architecture.

FIG. 2 illustrates a block diagram of AP 110 and two wireless STAs 120m and 120x in a MIMO/MLO system, such as system 100, in accordance with certain aspects of the present disclosure. In certain aspects, AP 110 and/or wireless STAs 120m and 120x may perform various techniques to ensure that a non-AP MLD is able to receive a group addressed frame. For example, AP 110 and/or wireless STAs 120m and 120x may include a respective association manager as described herein with respect to FIG. 1.

AP 110 is equipped with $N_{ap}$ antennas 224a through 224t. Wireless STA 120m is equipped with $N_{sta,m}$ antennas 252ma through 252mu, and wireless STA 120x is equipped with $N_{sta,x}$ antennas 252xa through 252xu. AP 110 is a transmitting entity for the DL and a receiving entity for the UL. Each wireless STA 120 is a transmitting entity for the UL and a receiving entity for the DL. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$ wireless STAs are selected for simultaneous transmission on the uplink, NDL wireless STAs are selected for simultaneous transmission on the downlink, $N_{UL}$ may or may not be equal to NDL, and $N_{UL}$ and NDL may be static values or can change for each scheduling interval. The beam-steering or some other spatial processing technique may be used at the access point and wireless station.

On the UL, at each wireless STA 120 selected for UL transmission, a transmit (TX) data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless STA and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ UL signals for transmission from $N_{sta,m}$ antennas 252 to AP 110.

$N_{UL}$ wireless STAs may be scheduled for simultaneous transmission on the uplink. Each of these wireless STAs performs spatial processing on its data symbol stream and transmits its set of transmit symbol streams on the UL to the AP 110.

At AP 110, $N_{ap}$ antennas 224a through 224ap receive the UL signals from all $N_{UL}$ wireless STAs transmitting on the UL. Each antenna 224 provides a received signal to a respective transceiver (RCVR) 222. Each transceiver 222 performs processing complementary to that performed by transceiver 254 and provides a received symbol stream. A receive (RX) spatial processor 240 performs receiver spatial processing on the $N_{ap}$ received symbol streams from $N_{ap}$ transceiver 222 and provides $N_{UL}$ recovered UL data symbol streams. The receiver spatial processing is performed in accordance with the channel correlation matrix inversion (CCMI), minimum mean square error (MMSE), soft interference cancellation (SIC), or some other technique. Each recovered UL data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless STA may be provided to a data sink 244 for storage and/or a controller 230 for further processing.

On the DL, at AP 110, a TX data processor 210 receives traffic data from a data source 208 for NDL wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides NDL DL data symbol streams for the NDL wireless stations. A TX spatial processor 220 performs spatial processing (such as a precoding or beamforming, as described in the present disclosure) on the NDL DL data symbol streams, and provides $N_{ap}$ transmit symbol streams for the $N_{ap}$ antennas. Each transceiver 222 receives and processes a respective transmit symbol stream to generate a DL signal. $N_{ap}$ transceivers 222 providing $N_{ap}$ DL signals for transmission from $N_{ap}$ antennas 224 to the wireless STAs.

At each wireless STA 120, $N_{sta,m}$ antennas 252 receive the $N_{ap}$ DL signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered DL data symbol stream for the wireless station. The receiver spatial processing is performed in accordance with the CCMI, MMSE or some other technique. An RX data processor 270 processes (e.g., demodulates, deinterleaves and decodes) the recovered DL data symbol stream to obtain decoded data for the wireless station.

At each wireless STA 120, a channel estimator 278 estimates the DL channel response and provides DL channel estimates, which may include channel gain estimates, SNR estimates, noise variance and so on. Similarly, a channel estimator 228 estimates the UL channel response and provides UL channel estimates. Controller 280 for each wireless STA typically derives the spatial filter matrix for the wireless station based on the downlink channel response matrix $H_{dn,m}$ for that wireless station. Controller 230 derives the spatial filter matrix for the AP based on the effective UL channel response matrix $H_{up,eff}$. Controller 280 for each wireless STA may send feedback information (e.g., the downlink and/or uplink eigenvectors, eigenvalues, SNR estimates, and so on) to the AP. Controllers 230 and 280 also control the operation of various processing units at AP 110 and wireless STA 120, respectively.

Overview of Multi-Link Devices

A multi-link device (MLD) generally refers to a single device or equipment that includes two or more station (STA) instances or entities, implemented in a physical (PHY)/medium access control (MAC) layer and configured to communicate on separate wireless links. In some examples, each MLD may include a single higher layer entity, such as a MAC Service Access Point (SAP) that may assign MAC protocol data units (MPDUs) for transmission by the separate STA instances.

Figure 3:
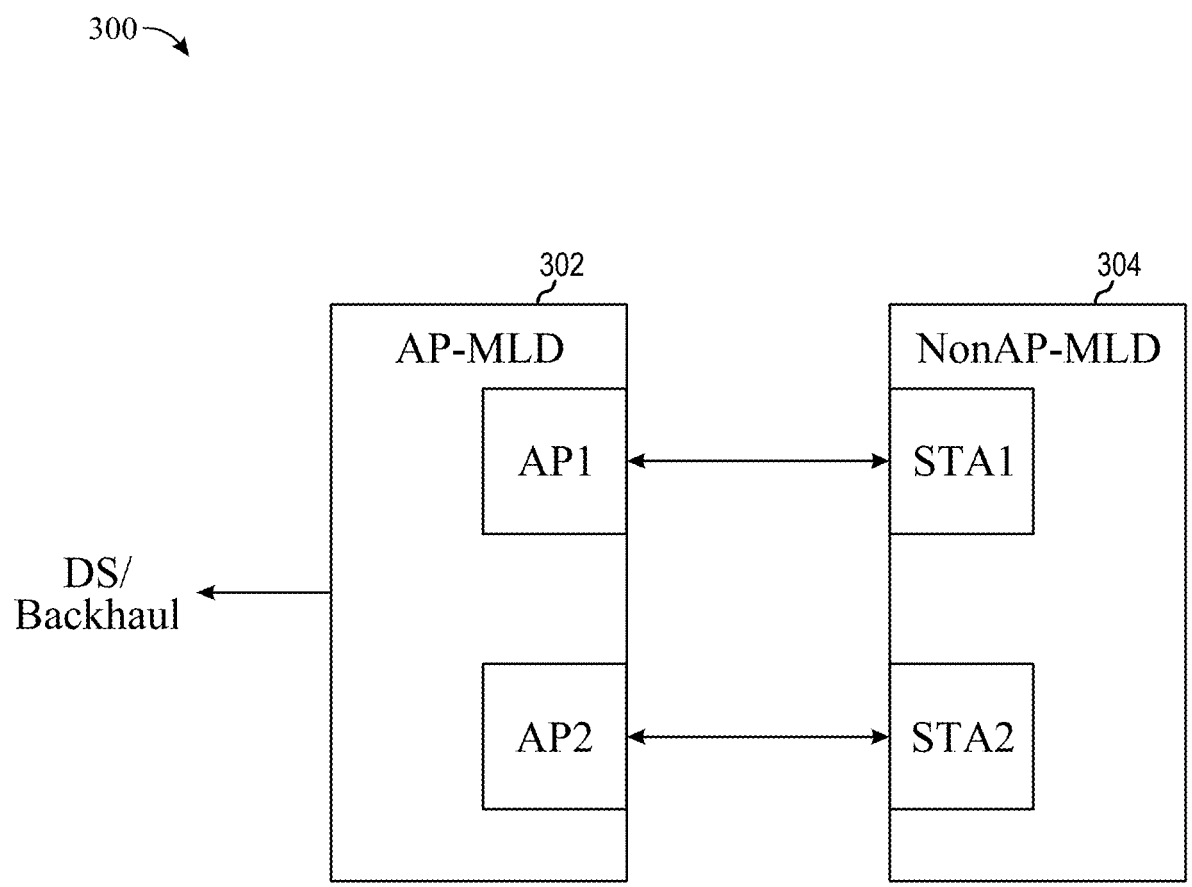
FIG. 3 depicts a block diagram of an example multi-link device (MLD) deployment.

FIG. 3 shows a block diagram of an example MLD deployment 300. As shown in FIG. 3, an access point (AP) MLD 302 may communicate with a non-AP MLD 304. Each of the AP MLD and non-AP MLD may include at least two STA entities (hereinafter also referred to simply as "STAs") that may communicate with associated STAs of another MLD. In an AP MLD, the STAs may be AP STAs (STAs serving as APs or simply "APs"). In a non-AP MLD, the STAs may be non-AP STAs (STAs not serving as APs). As also described above, MLDs may utilize multi-link aggregation (MLA) (which includes packet level aggregation), whereby MPDUs from a same traffic ID (TID) may be sent via two or more wireless links.

Various modes of communication may be employed in MLD implementations. For example, a MLD may communicate in an Asynchronous (Async) mode or a Synchronous (Sync) mode. The Async mode provides flexibility to adapt to channel loading, allowing an MLD to perform channel access, transmit, and receive data via multiple links asynchronously. Sync mode may be preferred, however, if RF leakage exists between channels, because synchronized transmission on all links is unaffected by RF leakage.

In the Async mode, a STA/AP may count down (for example, via a random backoff (RBO)) on both wireless links. A physical layer convergence protocol (PLCP) protocol data units (PPDU) start/end may happen independently on each of the wireless links. As a result, Async mode may potentially provide latency and aggregation gains. In certain cases, relatively complex (and costly) filters may be needed (for example, in the case of 5 GHz+6 GHz aggregation).

In the Sync mode, a STA/AP may also perform a backoff countdown on multiple wireless links as part of a channel access procedure. If a first link gains access to the medium through the channel access procedure, multiple links may transmit PPDUs at the same time. Accordingly, this mode may need some restrictions to minimize in-device interference.

The Sync mode may work in 5 GHz+6 GHz aggregation and may require relatively low-filter performance, while still providing latency and aggregation gains. However, due to that STA's tiled architecture, this latency and aggregation gains may be hard to achieve.

Although not shown, a third mode of communication may include a Basic (for example, multi-primary with single link transmission) mode. In the Basic mode, a STA/AP may also count down on both wireless links. However, transmission may only occur on the wireless link that gains access to the medium. The other wireless link may be blocked by in-device interference greater than −62 decibels per milliwatt (dBm). No aggregation gains may be realized in this mode.

Overview of an Example MLO Architecture

Figure 4:
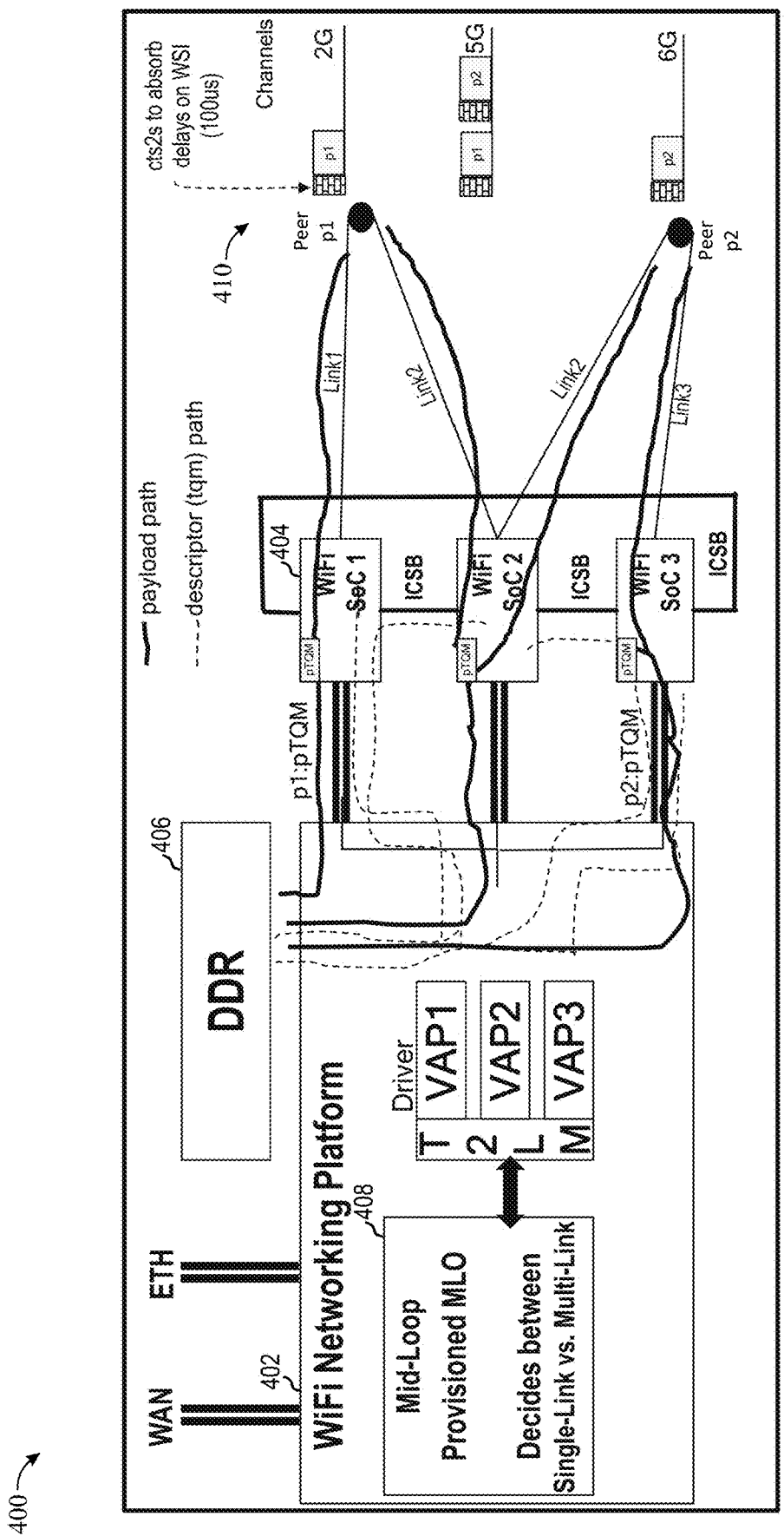
FIG. 4 depicts an example wireless communication architecture that supports multi-link operation (MLO).

FIG. 4 illustrates an example architecture 400 for multi-link operations in an access point (AP), capable of routing packets to or from one or more peer devices via radio components, such as WiFi Systems on a Chip (SoC) 404. The example architecture 400 implements what may be referred to as non-centralized queuing or non-centralized scheduling that relies on hardware selected path binding to transfer packets to/from a given peer. In the illustrated example, two peers (peer p1 and peer p2) are shown.

Architecture 400 may include a WiFi networking platform 402, with wide area network (WAN) and Ethernet back ends (where packets may ingress and egress), and memory (e.g., double data rate DDR memory 406). The memory may hold executable code (to implement the software-based algorithms described herein) and packets may be routed to/from the memory. The WiFi networking platform 402 may also include a kernel stack (driver) that implements virtual access points (VAPs).

The WiFi networking platform may also include user space intelligence (logic 408 labeled as mid-loop) that may perform certain functions, such as a function referred to herein as provisioned MLO 408. Provisioned MLO may help associate different radio bands to a given peer as follows. Each WiFi SoC may be associated with different radio band, which can transfer packets to/from a given peer. In the illustrated example, 3 WiFi SoCs 404 are shown: WiFi SoC 1 associated with 2G band, WiFi SoC 2 associated with 5G, and WiFi SoC 3 associated with 6G (e.g., a future standard release).

The illustrated example may assume that peer P1 (e.g., an 802.11be MLD device) has associated with WiFi SoC 1 indicating it is ready to communicate with the AP on Link 1 and Link 2. In this case, WiFi SoC 1 may communicate with the WiFi networking platform via an interface (e.g., PCIe). The mid-loop algorithm may decide (e.g., based on channel conditions, traffic load, and channel loading on links 1 and 2) whether to route packets to/from peer p1 in a single link mode or a multi-link mode (e.g., using all available links). The multi-link mode could include multi-link multi-radio (MLMR) or multi-link single radio (MLSR). With MLSR, an MLD is able to receive and transmit over one radio at a time, while MLMR allows an MLD to receive and transmit over multiple radios simultaneously.

One potential issue with using an MLMR mode (such as async MLMR mode), is that packets to/from a peer may be routed on any possible link at any time. Thus, network operators may lose control over the spectrum. This is because the ultimate decision of where the packet goes out, in architecture 400, may be made by the RF and the MAC level (at the WiFi SoC) in a just in time manner, based on instantaneous channel sensing. This channel sensing on which the link assignment is based is considered instantaneous because the link assignment is based on a current assessment of the channel. In contrast, certain software based link selection described below considers channel state feedback (e.g., CCA results on each link over a duration).

For example, hardware in the WiFi SoCs may sense the channel is free at a given time (t0) and send a first packet to Peer p1 on Link 1, a second packet to Peer p1 on Link 2, and a first packet to Peer p2 on Link 3.

This may be a potential disadvantage, from an operating standpoint, as an operator may lose control over its spectrum. As an example, while an operator may want to reserve a link to 5G as a premium spectrum (e.g., for extremely low latency traffic) the hardware based packet routing may prevent this (e.g., and allow the premium link to be inundated by a peer that does not have low latency traffic). Thus, the random act of multi-link spraying can lead to unintended congestion caused on multiple bands which may not be desirable to an operator in charge of delivering deterministic traffic flows across a wide range of connected devices across multiple bands.

Implementing a provisioned MLO function may help address this issue by deciding in a relatively slow manner whether to use a single link or multi-link mode for a given peer. For example, for a given peer, even if the peer is multi-link capable, logic implementing the provisioned MLO function may decide to send downlink traffic to, and receive uplink traffic from, that peer on only one link.

In some cases, this may be achieved through a mechanism referred to as Traffic ID (TID) to link mapping (T2LM). A T2LM action frame may be sent (e.g., by the driver) on a particular link to a peer, essentially instructing that peer that all of its transactions (uplink or downlink) will be on only one. In other words, even though that peer may be capable of transacting on both links, the T2LM frame indicates the AP will only be transacting with that peer on one link.

In this manner, provisioned MLO may give more spectrum management control to operators, effectively provisioning a peer to a given link of a multi-link operation. The algorithm may change the decision regularly, for example, and switch between multi-link and single-link modes (e.g., based on the evaluation of the traffic load of the peer, the medium congestion and a variety of factors) or switch a peer to another link. For example, the algorithm may switch (via a T2LM message) the peer to a different link if it is getting poor service on a current link. This may be done without the peer having to re-associate because, as an MLD device, it may have already declared an affiliation with the WiFi SoCs on multiple bands. So just through one single simple over the air message.

The algorithm may also switch a peer from a single-link mode to a multi-link mode, for example, if neither individual link is serving the peer well (as indicated by channel congestion, the freeness of the channel, the RSSI SNR, the amount of traffic, etc.). In this case, the provisioned MLO algorithm may send a T2LM message letting that peer know that it may be able to transact with the AP on all possible links (e.g., in a randomized manner).

The architecture 400 may need some type of logic to determine how to route packets, on which links, to a peer operating in a multi-link mode. For example, packets may be buffered (queued up) for WiFi SoC 1 waiting for an opportunity on the CSMA channel to send the packets out. Here, WiFi SoC 2 may also be waiting for an opportunity to send a packet out on its channel.

To avoid the same packet (with the same sequence number) from being sent on both channels, some form of serialization may be performed. The serialization may synchronize access to a packet by multiple WiFi SoCs. As illustrated, one possible way to achieve this serialization by (sideband) signaling between the WiFi SoCs, using an interface referred to as an inter-chip signaling bridge (labeled ICSB). If one WiFi SoC wins the medium it may send a signal indicating that it won the medium and is trying to send a particular packet out. If another WiFi SoC had not already started sending this, then that packet will be locked into this interface and the packet will start to be transmitted (over the PCIe) through that WiFi SoC. While the PCIe may be used for actual payload transfer, the serialization happens earlier (over a separate bus).

In some cases, serialization may be enforced by logic in the WiFi SoCs referred to as transmit queue management (TQM). In some cases, every peer may have one of the WiFi SoC designated as a primary or parent WiFi SoC for that peer (which may be designated at connection). The TQM block of the primary WiFi SoC is considered the primary TQM for that peer. No matter which WiFi SoC is trying to send a packet to a peer, it needs to communicate (over ICSB) with the primary TQM for that peer to ensure serialization, such that packets are given to only one WiFi SoC at a given time.

Unfortunately, this approach to serialization may be suboptimal. For example, even if a WiFi SoC wins the medium, it may not be able to send the packet out immediately, as it needs to consult with the primary TQM which results in some latency. As illustrated in the timeline 410 shown in FIG. 4, in some cases, to keep the medium (and keep other APs from transmitting), a WiFi SoC may send a clear to send (CTS) message (to itself). If the WiFi SoC does get the packet, it may send it. Otherwise, if it fails to get the packet, it has wasted the bandwidth of the medium by sending the CTS to self (which may be done on each of the links. In this manner, the serialization process described above may result in significant delays and inefficient use of bandwidth. As such, the act of instantaneous channel assessment and medium access is not directly correlated with instantaneous and fast data transaction over the air as a certain percentage of air time is used in just waiting for the back end synchronization to take place. Furthermore, the use of ICSB to perform externalized synchronization is costly (from a Bill of Materials (BOM)) standpoint and leads to complex board routing and signal integrity challenges.

Another potential issue with the example architecture 400 of FIG. 4 is the potential to engage in uncontrolled transmission across all links (which may be referred to a random spraying). As mentioned above, once the WiFi networking platform delivers a packet to the WiFi SoCs, it has no control over which link the packet is being transmitted. Rather, the particular WiFi SoC that ultimately sends the packet is based on hardware channel sensing. Thus, the packet may be sent (randomly) on any WiFi SoC, meaning there is little or no way to provide an operator control for the MLMR mode.

Aspects Related to a Flexible MLO Architecture

Aspects of the present disclosure, however, provide a flexible MLO architecture that allows packets to be assigned links using a software based processing path (SW MLMR) or a hardware based processing path (HW MLMR). The flexible MLO architecture proposed herein may allow for SW MLMR to be selected for optimal link selection based on accurate channel state information and also allows for operator selected biases to influence link selection. HW MLMR may be selected, however, when latency is a primary concern. Thus, the flexible architecture proposed herein may allow for software or hardware link selection to be dynamically selected, based on desired results and current operating conditions.

In some cases, a software algorithm may be implemented in the flexible architecture that selects a processing path, from first and second processing paths, for a packet to be routed from the at least one buffer (e.g., a queue is one example of a buffer that will be described herein and illustrated in the figures) to at least one of a plurality of radio components (e.g., WiFi SoCs) for wireless transmission to at least one peer via one or more links. As will be described in greater detail below, the first (SW MLMR) processing path may be configured to bind the packet to one of the one or more links based on at least one code-implemented rule, while the second (HW MLMR) processing path may be configured to bind the packet to one of the one or more links based on (e.g., immediate) channel sensing.

Figure 5:
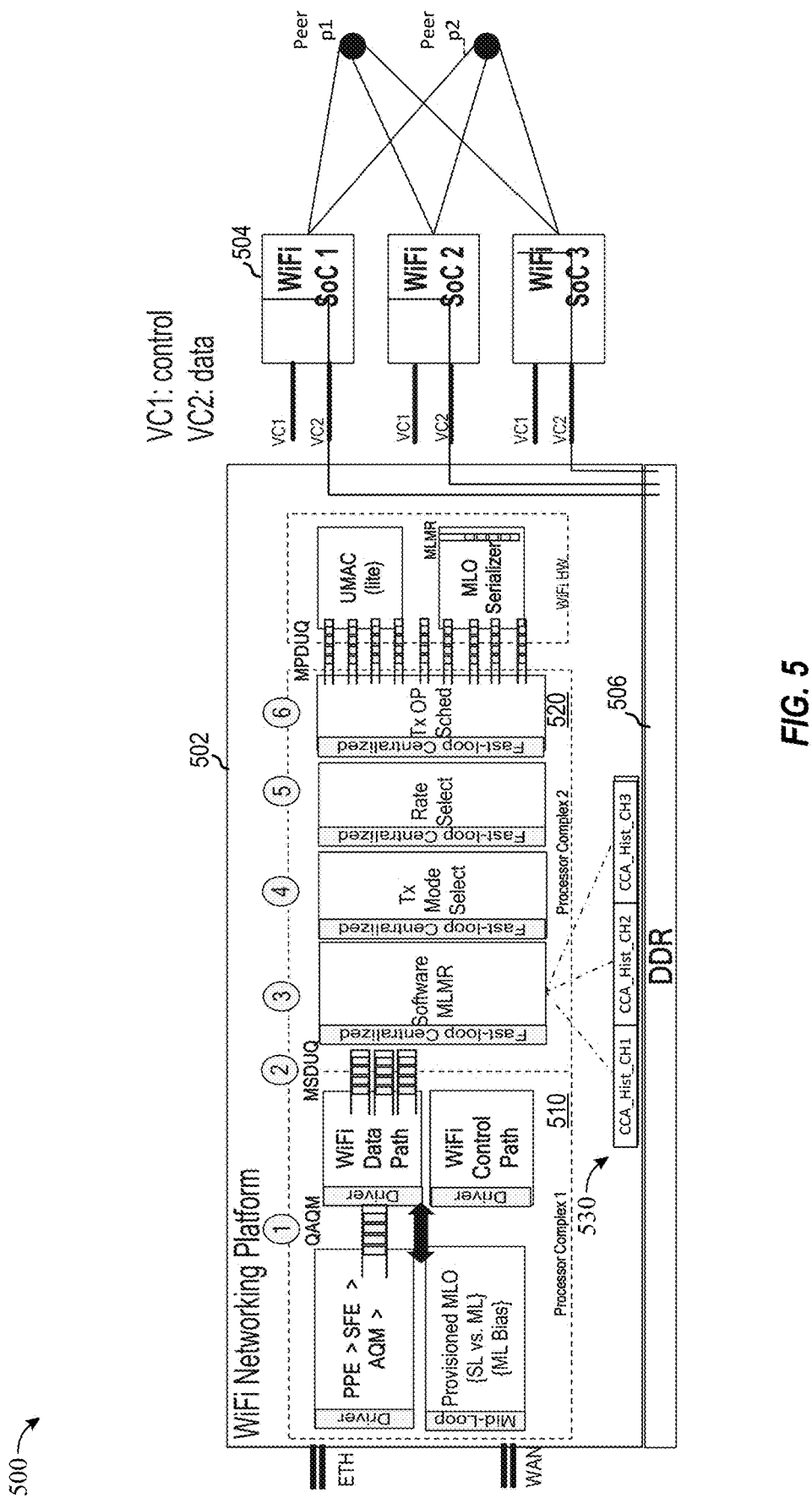
FIG. 5 depicts another example wireless communication architecture that supports MLO with dynamic selection between software based link selection and hardware based link selection.

FIG. 5 illustrates one example of a flexible MLO architecture 500 for multilink operations in an AP, in accordance with aspects of the present disclosure.

The example architecture 500 may implement a software algorithm that manages some flows into a software based MLMR processing path, while managing other flows into a hardware based MLMR processing path. As will be described in greater detail below, the software based MLMR processing path may bind packets to links based on arbitrarily recent channel state feedback (e.g., with programmable hash rules, code implemented rules, user inputs, biases, and the like), while the hardware based MLMR processing path may select links based on (just in time) channel sensing.

Similar to the architecture 400 of FIG. 4 described above, architecture 500 may include a WiFi networking platform 502, with WAN and Ethernet back ends, and DDR memory 506. The memory may hold executable code and packets may be routed between the memory and radio components. In the illustrated example, the radio components are discrete WiFi SoCs 506, which may be connected to a platform SoC (on which the WiFi networking platform implemented) via a bus (e.g., PCIe). This approach may allow for separate entities to provide the platform SoC and WiFi SoCs.

The WiFi networking platform may also include various functional modules (in a first processor complex 510). For example, the functional modules may include a packet processing engine (PPE) that interfaces with the Ethernet networking stack (e.g., and may generate an interrupt whenever packets ingress from the Ethernet port). The first processor complex 510 and a second processor complex 520 are merely examples of how functional components of the WiFi networking platform may be organized. For example, functional components that access the same types of data at the same rate may be grouped into a functional complex located in a same area of the WiFi networking platform, which may be implemented as an SoC.

In some cases, a shortcut forwarding engine (SFE) may take a packet and bypass the core networking stack for some time sensitive reason, for example, if it determines that this packet pertains to what kind of a flow is that a flow that is extremely low latency. The SFE may identify flows at different levels of detail, from general (low latency or background traffic) to more specific (e.g., identifying a flow to be an XR flow, a cloud gaming flow, a voice call, or a file transfer.

Packets may then go to an active queue management (AQM) to be queued into a certain queue (at label 1). For example, AQM may choose to not send the packets when they arrive. Rather the AQM may choose certain packets which are deemed important and pick those to send to a Wi-Fi driver to be processed in a WiFi data path. The WiFi networking platform may also include a provisioned MLO component to select between single link and multiple link (ML) operation for the at least one peer. The following description of software and hardware based MLMR assumes an ML mode is selected.

The AQM may selectively transfer (push out) only certain packets to the Wi-Fi data path. The Wi-Fi driver takes those packets and creates a MAC service data unit (MSDU), and place into a MSDU queue (MSDUQ at label (2)). Multiple MSDU are shown, each represents a given flow for a given peer. Assuming one peer can have four different kinds of flows or four different latencies, that peer can have four different MSDU Queues (each peer may have a similar such number of different MSDU Queues). As illustrated, in some implementations, components of a second processor core may process packets that show up the MSDU queue.

Functional components in a second processor complex 520 may perform the multilink operation, effectively implementing a faster loop in order to adhere to the timelines of the wireless medium. As illustrated, a software MLMR component may first access the packets. The software MLMR component may decide which link a packet is to be sent on. A transmission mode select component may make a mode selection, deciding whether to send a packet to a given peer in a single user mode or to try to group the packet, in a multi user mode, with packets for another peer (e.g., who happen to be in the same MLO group). The MLMR component could also perform orthogonal frequency division multiple access (OFDMA) to multiple peers in the same time across different resource units (RUs). Once the mode is selected, a rate select component may select a common denominator MCS. Finally, a transmit opportunity (TXOP) scheduling component may schedule that particular TXOP for that targeted peer.

As illustrated, each WiFi SoC may communicate via two virtual channels, VC1 and VC2 (which may be implemented on PCIe). In the illustrated example, VC1 may be used for control signaling (to interface with what is labeled to as a WiFi hardware block). VC2 may be used for the data payload transfer, as indicated by its connection to the DDR.

As noted above, a software MLMR algorithm (SW MLMR) may make the decision, in a processing path, of whether to send a packet for a particular peer on one particular link or another. In some cases, the SW MLMR may bind a packet to one of the one or more links based on an assessment of channel state feedback for the one or more links.

For example, the assessment of channel state feedback may be based on clear channel assessment (CCA) results for each channel over an adjustable duration of time. In the illustrated example, a history of CCA results are stored for each link associated with the WiFi SoCs (CH1, CH2, and CH3). The CCA results may indicate a percentage that CCA passed (indicating the channel was free) for the adjustable duration of time (e.g., 500 ms).

In some cases, the duration could be made arbitrarily small, effectively resulting in an instantaneous channel sensed mode or, on the other hand, could be made large to provide more controllability to application.

As illustrated, the CCA history could be located (in registers 530) on the WiFi networking platform, making the content readily accessible to the software MLMR for considering when making link assignments. For example, the software MLMR could find the channel for one WiFi SoC is the best (e.g., considering CCA plus a bias) and may assign a link to that channel. In some cases, packets could be bound to links in a pro-rata share based on the CCA history.

Figure 6A:
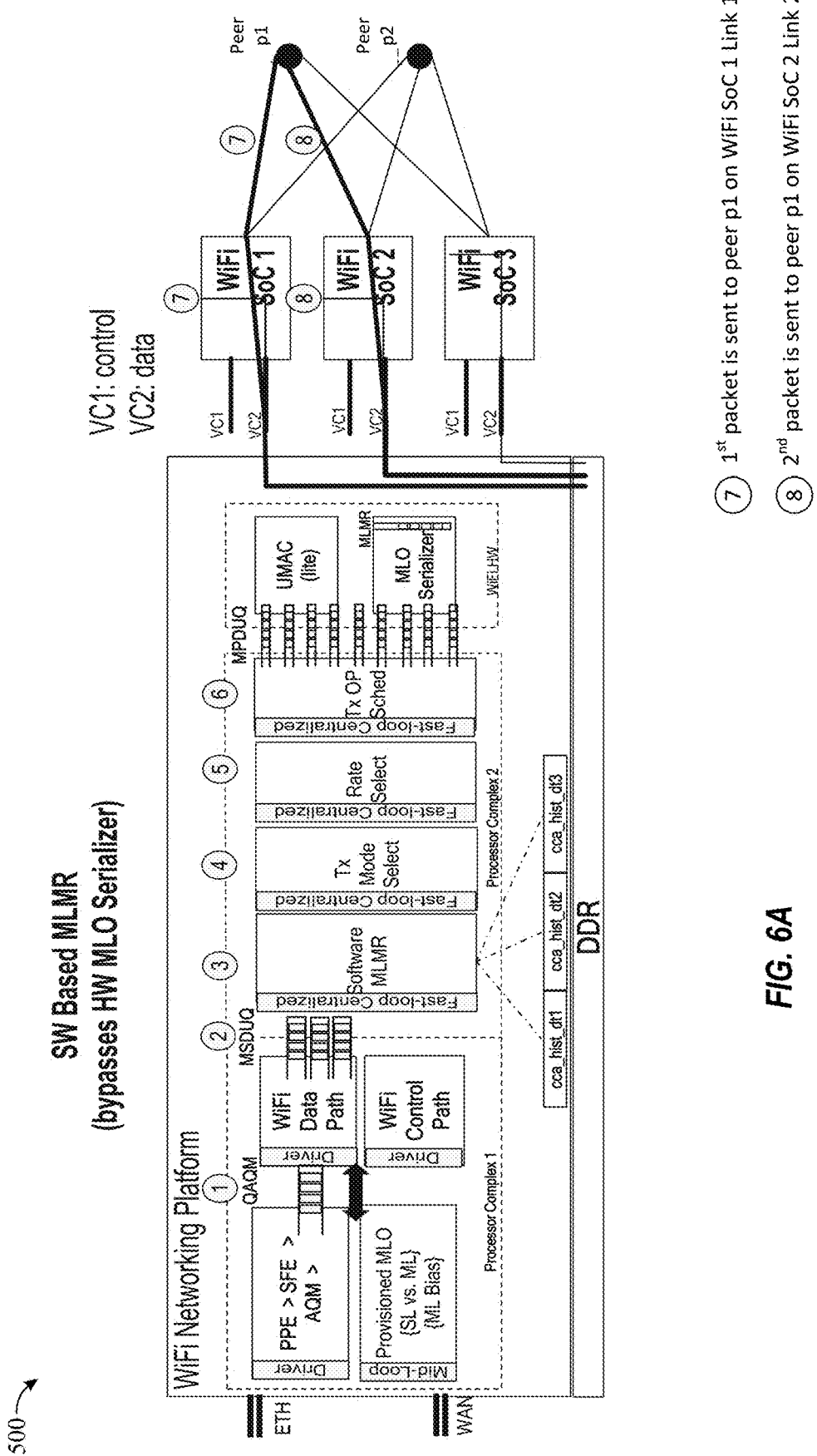
FIGS. 6A and 6B depict how the example wireless communication architecture of FIG. 5 may manage some packets for software-based multi-link multi-radio link (MLMR) and other packets for hardware-based MLMR.

Link selection based on SW MLMR may be understood with reference to FIG. 6A. While FIG. 5 shows the general components of the architecture 500, FIG. 6A assumes a software based MLMR (SW MLMR) processing path has been selected and illustrates example data paths for packets bound to certain links using SW MLMR. This approach provides flexibility in that the SW MLMR could assign packets to links based on channel state feedback and/or code-implemented rules.

In the illustrated example, in a first scheduling as indicated at (7), the SW MLMR sends a first packet to the first peer p1 on a WiFi SoC 1-Link1. In another scheduling as indicated at (8), a second packet is sent to p1 on WiFi SoC2-Link2. As noted above, the decisions could be made based on channel assessment with necessary biasing and flow-hashing. In the illustrated example, Link 1 and Link 2 may be chosen over Link 3 (of WiFi SoC 3) because the CCA history may be 80% for Link 1, 50% for Link 2, and 20% for Link 3. The CCA values may be queried each time there are packets to route.

SW MLMR may also provide flexibility for customer control over spectrum. For example, the SW MMLMR may apply a biasing function (based on a code-implemented rule). For example, the biasing function may dictate that link selection for packets with a given tuple is based on a mathematical function, such as a hash function. Based on the function, Link 1 or Link 2 may be chosen because a customer may want to use one of the links in a different loaded manner. Therefore, channel loading may be used as an input to make a final channel selection determination. Some mathematically determined function may ultimately determine that a certain packet will go to a certain link. For example, such a mathematically determined function may select a link based on a mathematical combination of a programmable hash and channel state feedback.

In some cases, packet failures may be addressed. For example, if a packet assigned to a certain link via SW MLMR has a failure, some action may be taken. For example, a WiFi SoC may indicate a Tx failure and signal that to the software MLMR. The software MLMR may make a decision, for example, to requeue that packet to be sent on the same link (if the channel state indicates similar conditions) or could requeue the packet into a different link. In some cases, an attempt may be made to transmit a failed packet for a certain duration (e.g., a programmable timeout) or number of attempts before discarding the packet.

Figure 6B:
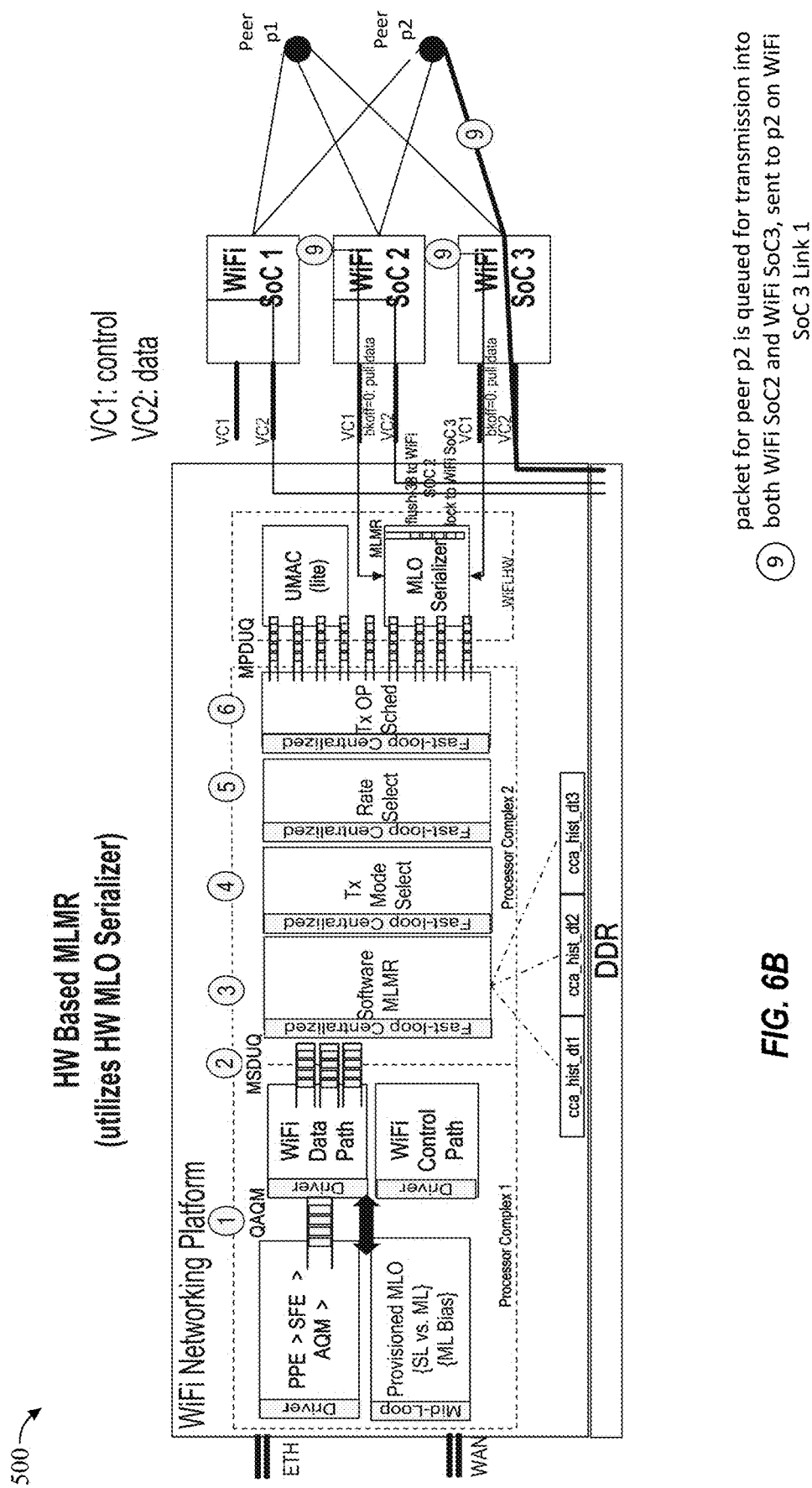

Link selection based on HW MLMR may be understood with reference to FIG. 6B. FIG. 6B assumes a hardware based MLMR (HW MLMR) processing path has been selected and illustrates an example data path for a packet bound to certain links using channel sensing. This approach provides an option for avoiding potential latency associated with the SW MLMR based link assignment in a channel with high interference from other WLAN devices. As noted above, HW MLMR may select a link based on just in time channel sensing.

This approach may be used, for example, for packets of a certain flow which has a low latency requirement. The architecture proposed herein provides the flexibility to choose a hardware based routing based on channel sensing, over a software based routing in this case.

With hardware based MLMR routing of a packet, each of the WiFi SoCs may try to access the medium send the packet out. Each WiFi SoC may be aware of the packet and looks for an opportunity in the medium by performing a CCA. Each WiFi SoC may perform a backoff after attempting to access the channel. Once a backoff timer expires, a WiFi SoC may send a pull request to the platform, via the control plane VC1. Just because the backup timer expires does not mean the WiFi SoC will gain the medium. Some other WiFi SoC may win the medium instead. The pull requests may be sent to an MLO serializer block, which may receive request from multiple WiFi SoCs and have to decide which will end up with the packet.

This is illustrated in the example shown in FIG. 6B, which assumes a packet to peer p2 is to be queued for transmission into both WiFi SoC2 and WiFi SoC3. In this example, WiFi SoC1 may be excluded intentionally. Initially the packet is not locked to a particular channel, for example, as backoff timers may not have expired. Once the backoff expires, each WiFi SoC may send a (data pull) request to the HW MLO serializer to access the packet. In this case, the hardware MLO serializer may make sure the packet is sent on only one channel. In the illustrated example, the packet is locked into WiFi SoC3 and sent to peer p2 over WiFi SoC Link3. In this case, WiFi SoC2 may receive a flush command.

With reduced latency, the flexible architecture proposed herein may reduce the need to perform the CTS-to-self signaling described above in order to maintain the medium. As described above, a WiFi SoC may send a request as soon as its backoff timer expires, with reduced latency due to the direct path over VC1 to the serialization block. If for some reason, however, a WiFi SoC does not get a packet within an expected time, it may still perform a CTS-to-self signaling. Because the CTS-to-self may only be sent if the packet did not arrive within an expected time, as opposed to always sending a CTS-to-self, this may be called a conditional CTS-to-self.

The flexible architecture proposed herein may allow for software or hardware link selection to be selected, based on desired results and current operating conditions. For example, in many cases, link selection to be optimized using a software based MLMR processing path that considers accurate channel state information and/or operator selected biases. In some cases, the hardware based processing path may be selected, for example, due to reduced latency.

Example Operations of an Access Point

Figure 7:
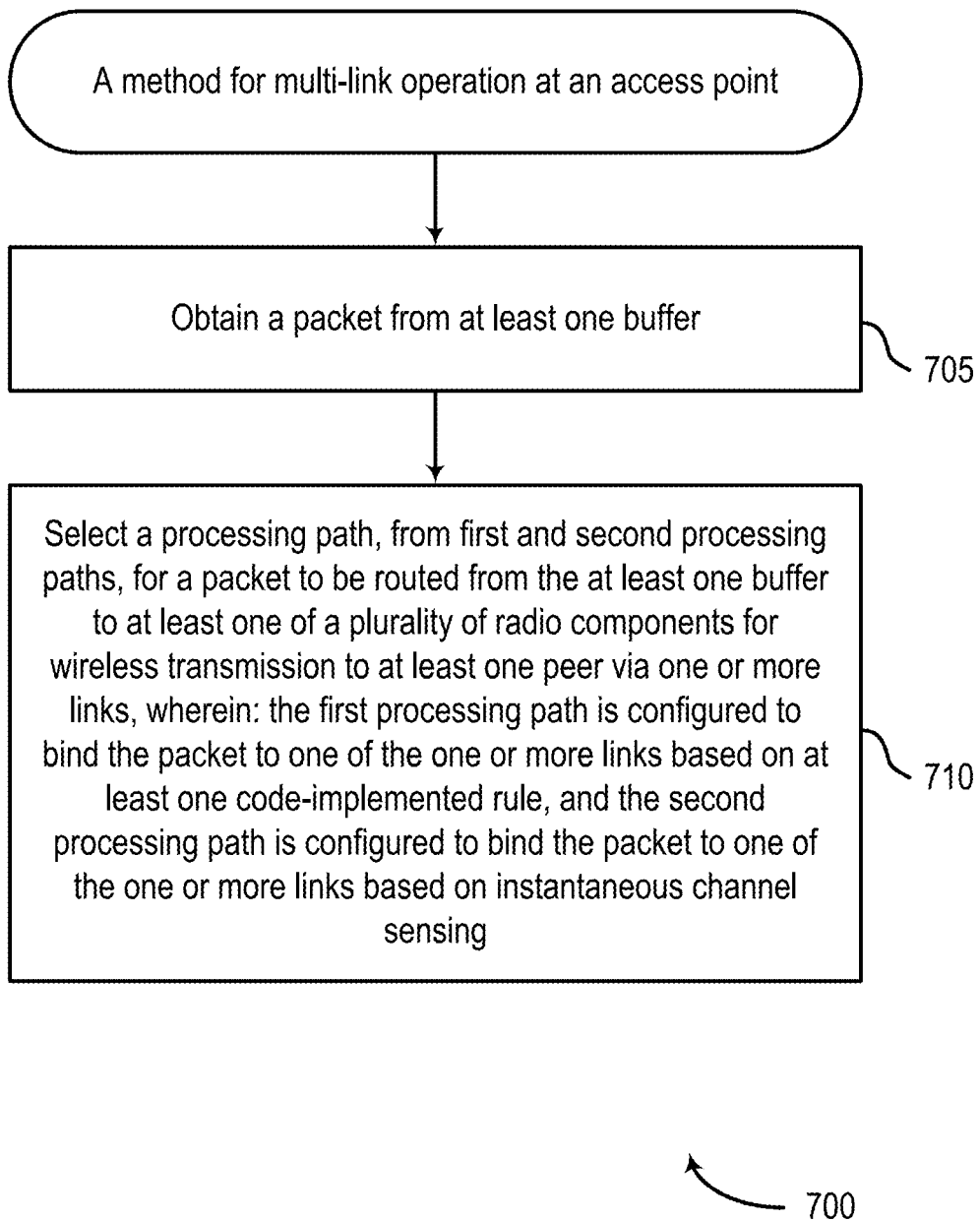
FIG. 7 depicts a flowchart illustrating an example method for multi-link operation.

FIG. 7 shows an example of a method 700 for multi-link operation at an access point, such as an AP 110 of FIGS. 1 and 2.

Method 700 begins at step 705 with obtaining a packet from at least one queue. In some cases, the operations of this step refer to, or may be performed by, circuitry for obtaining and/or code for obtaining as described with reference to FIG. 8.

Method 700 then proceeds to step 710 with selecting a processing path, from first and second processing paths, for a packet to be routed from the at least one queue to at least one of a plurality of radio components for wireless transmission to at least one peer via one or more links, wherein: the first processing path is configured to bind the packet to one of the one or more links based on at least one code-implemented rule, and the second processing path is configured to bind the packet to one of the one or more links based on channel sensing. In some cases, the operations of this step refer to, or may be performed by, circuitry for selecting and/or code for selecting as described with reference to FIG. 8.

In some aspects, the first processing path is configured to bind the packet to one of the one or more links based on an assessment of channel state feedback for the one or more links.

In some aspects, the assessment of channel state feedback is based on CCA results over an adjustable duration of time.

In some aspects, the second processing path is configured to bind the packet to one of the one or more links based on current channel sensing.

In some aspects, the first processing path is configured to bind the packet to one of the one or more links independent of channel state feedback assessment for the one or more links.

In some aspects, the selecting is performed by at least one first processing block implemented on a platform SoC; and each of the radio components comprises a discrete SoC connected to the platform SoC via a bus.

In some aspects, at least one of the radio components is configured to provide a CTS message, to reserve a medium, if a particular packet is not obtained by the at least one of the radio components by an particular time.

In some aspects, the method 700 further includes obtaining packets. In some cases, the operations of this step refer to, or may be performed by, circuitry for obtaining and/or code for obtaining as described with reference to FIG. 8.

In some aspects, the method 700 further includes obtaining channel state feedback regarding the one or more links. In some cases, the operations of this step refer to, or may be performed by, circuitry for obtaining and/or code for obtaining as described with reference to FIG. 8.

In some aspects, the method 700 further includes selecting which of the obtained packets to place in the at least one queue based on at least one of a programmable hash or the channel state feedback. In some cases, the operations of this step refer to, or may be performed by, circuitry for selecting and/or code for selecting as described with reference to FIG. 8.

In some aspects, the method 700 further includes selecting between single link operation and multiple link operation for the at least one peer, wherein the selecting of the processing path is performed only when the multiple link operation is selected. In some cases, the operations of this step refer to, or may be performed by, circuitry for selecting and/or code for selecting as described with reference to FIG. 8.

In some aspects, the method 700 further includes selecting a subset of the one or more links based on channel state feedback, wherein the second processing path binds one or more packets to only one or more links in the subset based on instantaneous channel sensing. In some cases, the operations of this step refer to, or may be performed by, circuitry for selecting and/or code for selecting as described with reference to FIG. 8.

In some aspects, the selection of the processing path is performed at a peer level, a flow level, or both a peer level and flow level.

In some aspects, the method 700 further includes performing serialization of packets bound to the one or more links via the second processing path. In some cases, the operations of this step refer to, or may be performed by, circuitry for performing and/or code for performing as described with reference to FIG. 8.

In some aspects, the first processing path is further configured to bypass performing the serialization.

In some aspects, the at least one code-implemented rule involves at least one of: one or more user-controlled option selections; or one or more user biases.

In some aspects, at least one of the one or more user-controlled option selections or the one or more user biases are based on a hash of packet meta data.

In some aspects, the method 700 further includes obtaining an indication of a transmission failure of the packet. In some cases, the operations of this step refer to, or may be performed by, circuitry for obtaining and/or code for obtaining as described with reference to FIG. 8.

In some aspects, the method 700 further includes assigning the packet to a same link on which the transmission failure occurred. In some cases, the operations of this step refer to, or may be performed by, circuitry for assigning and/or code for assigning as described with reference to FIG. 8.

In some aspects, the method 700 further includes reassigning the packet to a different link. In some cases, the operations of this step refer to, or may be performed by, circuitry for reassigning and/or code for reassigning as described with reference to FIG. 8.

In some aspects, the method 700 further includes selecting the second processing path to bind the packet to one or more of the one or more links based on channel sensing. In some cases, the operations of this step refer to, or may be performed by, circuitry for selecting and/or code for selecting as described with reference to FIG. 8.

Figure 8:
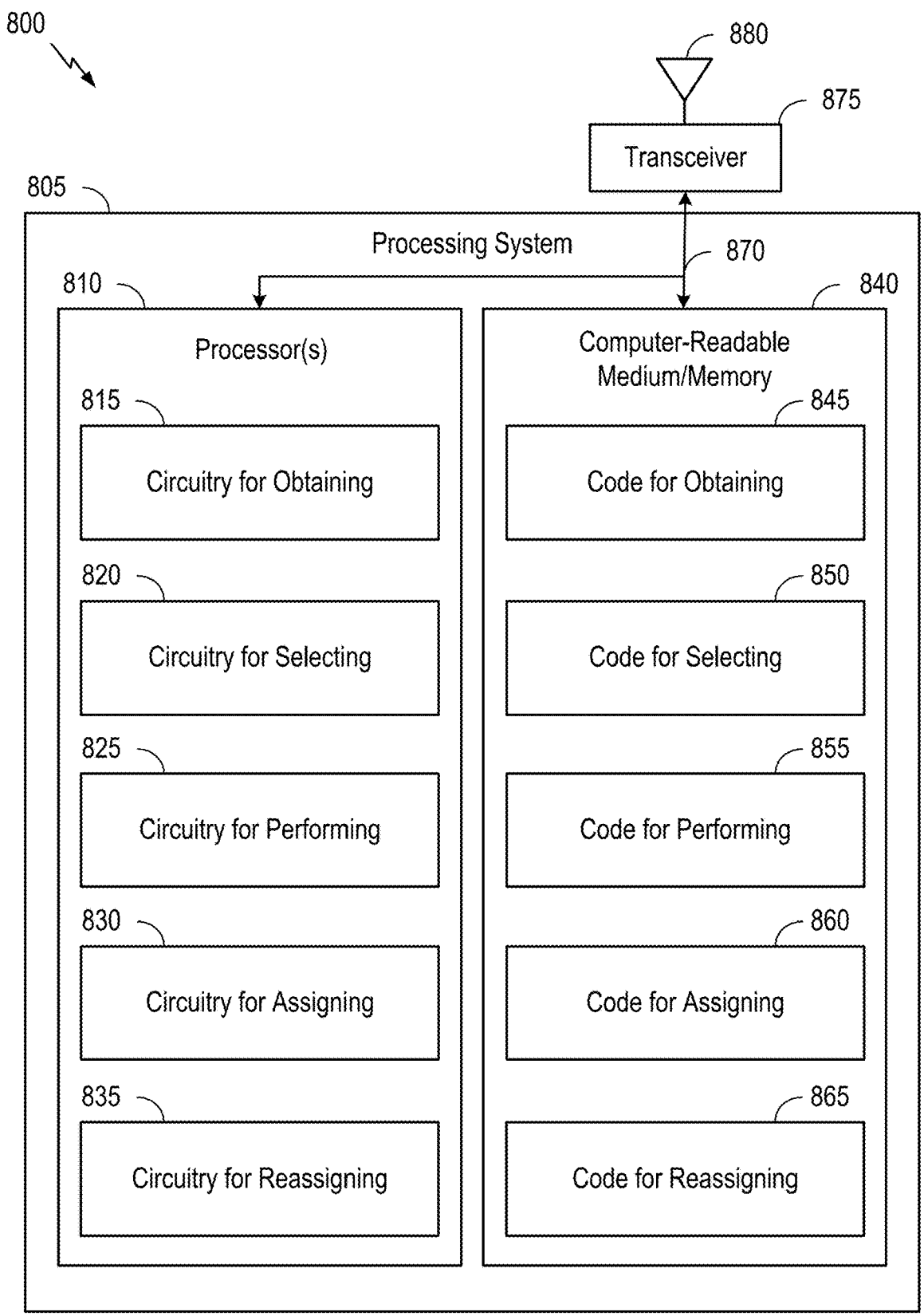
FIG. 8 depicts a block diagram of an example wireless communications device.

In one aspect, method 700, or any aspect related to it, may be performed by an apparatus, such as communications device 800 of FIG. 8, which includes various components operable, configured, or adapted to perform the method 700. Communications device 800 is described below in further detail.

Note that FIG. 7 is just one example of a method, and other methods including fewer, additional, or alternative steps are possible consistent with this disclosure.

Example Communications Device

FIG. 8 depicts aspects of an example communications device 800. In some aspects, communications device 800 is an AP, such as an AP 110 described above with respect to FIGS. 1 and 2.

The communications device 800 includes a processing system 805 coupled to the transceiver 875 (e.g., a transmitter and/or a receiver). The transceiver 875 is configured to transmit and receive signals for the communications device 800 via the antenna 880, such as the various signals as described herein. The transceiver 875 may be an example of aspects of transceiver 222 described with reference to FIG. 2. The processing system 805 may be configured to perform processing functions for the communications device 800, including processing signals received and/or to be transmitted by the communications device 800.

The processing system 805 includes one or more processors 810. In various aspects, the one or more processors 810 may be representative of one or more of the RX data processor 242, the TX data processor 210, the TX spatial processor 220, or the controller 230 of AP 110 illustrated in FIG. 2. The one or more processors 810 are coupled to a computer-readable medium/memory 840 via a bus 870. In certain aspects, the computer-readable medium/memory 840 is configured to store instructions (e.g., computer-executable code) that when executed by the one or more processors 810, cause the one or more processors 810 to perform the method 700 described with respect to FIG. 7, or any aspect related to it. Note that reference to a processor performing a function of communications device 800 may include one or more processors 810 performing that function of communications device 800.

In the depicted example, computer-readable medium/memory 840 stores code (e.g., executable instructions), such as code for obtaining 845, code for selecting 850, code for performing 855, code for assigning 860, and code for reassigning 865. Processing of the code for obtaining 845, code for selecting 850, code for performing 855, code for assigning 860, and code for reassigning 865 may cause the communications device 800 to perform the method 700 described with respect to FIG. 7, or any aspect related to it.

The one or more processors 810 include circuitry configured to implement (e.g., execute) the code stored in the computer-readable medium/memory 840, including circuitry such as circuitry for obtaining 815, circuitry for selecting 820, circuitry for performing 825, circuitry for assigning 830, and circuitry for reassigning 835. Processing with circuitry for obtaining 815, circuitry for selecting 820, circuitry for performing 825, circuitry for assigning 830, and circuitry for reassigning 835 may cause the communications device 800 to perform the method 700 described with respect to FIG. 7, or any aspect related to it.

Various components of the communications device 800 may provide means for performing the method 700 described with respect to FIG. 7, or any aspect related to it. For example, means for transmitting, sending or outputting for transmission may include the transmitter unit 222 or an antenna(s) 224 of AP 110 illustrated in FIG. 2 and/or the transceiver 875 and the antenna 880 of the communications device 800 in FIG. 8. In some aspects, means for receiving or obtaining may include the receiver unit 222 or an antenna(s) 224 of AP 110 illustrated in FIG. 2 and/or the transceiver 875 and the antenna 880 of the communications device 800 in FIG. 8.

EXAMPLE CLAUSES

Implementation examples are described in the following numbered clauses:

Clause 1: A method for multi-link operation at an access point, comprising: obtaining a packet from at least one queue; and selecting a processing path, from first and second processing paths, for a packet to be routed from the at least one queue to at least one of a plurality of radio components for wireless transmission to at least one peer via one or more links, wherein: the first processing path is configured to bind the packet to one of the one or more links based on at least one code-implemented rule, and the second processing path is configured to bind the packet to one of the one or more links based on instantaneous channel sensing.

Clause 2: The method of Clause 1, wherein the first processing path is configured to bind the packet to one of the one or more links based on an assessment of channel state feedback for the one or more links.

Clause 3: The method of Clause 2, wherein the assessment of channel state feedback is based on CCA results over an adjustable duration of time.

Clause 4: The method of any one of Clauses 1-3, wherein the second processing path is configured to bind the packet to one of the one or more links based on current channel sensing.

Clause 5: The method of any one of Clauses 1-4, wherein the first processing path is configured to bind the packet to one of the one or more links independent of channel state feedback assessment for the one or more links.

Clause 6: The method of any one of Clauses 1-5, wherein: the selecting is performed by at least one first processing block implemented on a platform SoC; and each of the radio components comprises a discrete SoC connected to the platform SoC via a bus.

Clause 7: The method of any one of Clauses 1-6, wherein at least one of the radio components is configured to provide a CTS message, to reserve a medium, if a particular packet is not obtained by the at least one of the radio components by an particular time.

Clause 8: The method of any one of Clauses 1-7, further comprising: obtaining packets, obtaining channel state feedback regarding the one or more links, and selecting which of the obtained packets to place in the at least one queue based on at least one of a programmable hash or the channel state feedback Clause 9: The method of any one of Clauses 1-8, further comprising: selecting between single link operation and multiple link operation for the at least one peer, wherein the selecting of the processing path is performed only when the multiple link operation is selected.

Clause 10: The method of any one of Clauses 1-9, further comprising: selecting a subset of the one or more links based on channel state feedback, wherein the second processing path binds one or more packets to only one or more links in the subset based on current channel sensing.

Clause 11: The method of any one of Clauses 1-10, wherein the selection of the processing path is performed at a peer level, a flow level, or both a peer level and flow level.

Clause 12: The method of any one of Clauses 1-11, further comprising: performing serialization of packets bound to the one or more links via the second processing path.

Clause 13: The method of Clause 12, wherein the first processing path is further configured to bypass performing the serialization.

Clause 14: The method of any one of Clauses 1-13, wherein the at least one code-implemented rule involves at least one of: one or more user-controlled option selections; or one or more user biases.

Clause 15: The method of Clause 14, wherein at least one of the one or more user-controlled option selections or the one or more user biases are based on a hash of packet meta data.

Clause 16: The method of any one of Clauses 1-15, further comprising: obtaining an indication of a transmission failure of the packet; and assigning the packet to a same link on which the transmission failure occurred; reassigning the packet to a different link; or selecting the second processing path to bind the packet to one or more of the one or more links based on channel sensing Clause 17: An apparatus, comprising: a memory comprising executable instructions; and a processor configured to execute the executable instructions and cause the apparatus to perform a method in accordance with any one of Clauses 1-16.

Clause 18: An apparatus, comprising means for performing a method in accordance with any one of Clauses 1-16.

Clause 19: A non-transitory computer-readable medium comprising executable instructions that, when executed by a processor of an apparatus, cause the apparatus to perform a method in accordance with any one of Clauses 1-16.

Clause 20: A computer program product embodied on a computer-readable storage medium comprising code for performing a method in accordance with any one of Clauses 1-16.

Clause 21: An access point (AP), comprising a plurality of radio components; at least one buffer; and at least one first processing block configured to select a processing path, from first and second processing paths, for a packet to be routed from the at least one buffer to at least one of the plurality of radio components for wireless transmission to at least one peer via one or more links, wherein: the first processing path is configured to bind the packet to one of the one or more links based on at least one code-implemented rule, and the second processing path is configured to bind the packet to one of the one or more links based on instantaneous channel sensing.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at an access point (AP) for multi-link operation (MLO), comprising:
    a plurality of radio components;
    at least one buffer; and
    at least one first processing block configured to select a processing path, from first and second processing paths, for a packet to be routed from the at least one buffer to at least one of the plurality of radio components for wireless transmission to at least one of a plurality of peers via one or more links between the plurality of radio components and the plurality of peers, wherein:
    the first processing path is configured to bind the packet to a first link of the one or more links based on at least one code-implemented rule that incorporates a biasing function, and
    the second processing path is configured to bind the packet to a second link of the one or more links based on instantaneous channel sensing, wherein the first link is different from the second link.

2. The apparatus of claim 1, wherein the first processing path is configured to bind the packet to one of the one or more links based on an assessment of channel state feedback for the one or more links.

3. The apparatus of claim 2, wherein the assessment of channel state feedback is based on clear channel assessment (CCA) results over an adjustable duration of time.

4. The apparatus of claim 1, wherein the first processing path is configured to bind the packet to one of the one or more links independent of channel state feedback assessment for the one or more links.

5. The apparatus of claim 1, wherein:
    the at least one first processing block is implemented on a platform system on a chip (SoC); and
    each of the radio components comprises a discrete system on a chip (SoC) connected to the platform SoC via a bus.

6. The apparatus of claim 1, wherein at least one of the radio components is configured to provide a clear to send (CTS) message, to reserve a medium, when a particular packet is not obtained by the at least one of the radio components by an particular time.

7. The apparatus of claim 1, further comprising at least one second processing block configured to:
    obtain packets;
    obtain channel state feedback regarding the one or more links; and
    select which of the obtained packets to place in the at least one buffer based on at least one of a programmable hash, the channel state feedback, or a certain mathematical combination of the programmable hash and the channel state feedback.

8. The apparatus of claim 1, further comprising:
    at least one second processing block configured to select between single link operation and multiple link operation for the at least one peer, wherein the at least one first processing block is configured to select the processing path only when the multiple link operation is selected.

9. The apparatus of claim 1, wherein:
    the at least one first processing block is further configured to select a subset of the one or more links based on channel state feedback; and
    the second processing path binds one or more packets to only one or more links in the subset based on current channel sensing.

10. The apparatus of claim 1, wherein the at least one first processing block is configured to perform the processing path selection at a peer level, a flow level, or both a peer level and flow level.

11. The apparatus of claim 1, further comprising:
    a serialization component configured to perform serialization of packets bound to the one or more links via the second processing path.

12. The apparatus of claim 11, wherein the at least one first processing path is further configured to bypass the serialization component.

13. The apparatus of claim 1, wherein the at least one code-implemented rule involves at least one of:

one or more user-controlled option selections; or one or more user biases.

14. The apparatus of claim 13, wherein at least one of the one or more user-controlled option selections or the one or more user biases are based on a hash of packet meta data.

15. The apparatus of claim 1, wherein the at least one first processing block is further configured to:

obtain an indication of a transmission failure of the packet based on an adjustable time window of observation; and assign the packet to a same link on which the transmission failure occurred;

reassign the packet to a different link; or select the second processing path to bind the packet to one or more of the one or more links based on instantaneous channel sensing.

16. A method for multi-link operation (MLO) at an access point (AP), comprising:

obtaining a packet from at least one buffer; and selecting a processing path, from first and second processing paths, for a packet to be routed from the at least one buffer to at least one of a plurality of radio components for wireless transmission to at least one of a plurality of peers via one or more links between the plurality of radio components and the plurality of peers, wherein:

the first processing path is configured to bind the packet to a first link of the one or more links based on at least one code-implemented rule that incorporates a biasing function, and the second processing path is configured to bind the packet to a second link of the one or more links based on instantaneous channel sensing, wherein the first link is different from the second link.

17. The method of claim 16, wherein the first processing path is configured to bind the packet to one of the one or more links based on an assessment of channel state feedback for the one or more links.

18. The method of claim 16, wherein the assessment of channel state feedback is based on clear channel assessment (CCA) results over an adjustable duration of time.

19. The method of claim 16, wherein the first processing path is configured to bind the packet to one of the one or more links independent of channel state feedback assessment for the one or more links.

* * * * *